(12) United States Patent
Beschorner et al.

(10) Patent No.: US 9,599,238 B2
(45) Date of Patent: Mar. 21, 2017

(54) VALVE HAVING IMPROVED SPOOL GEOMETRY

(71) Applicant: Caterpillar Inc., Peoria, IL (US)

(72) Inventors: Matthew J. Beschorner, Plainfield, IL (US); Bryan A. Johnson, Montgomery, IL (US); Hideki Nakajima, Hyogoken (JP)

(73) Assignee: Caterpillar Inc., Peoria, IL (US)

( * ) Notice: Subject to any disclaimer, the term of this patent is extended or adjusted under 35 U.S.C. 154(b) by 27 days.

(21) Appl. No.: 14/678,101

(22) Filed: Apr. 3, 2015

(65) Prior Publication Data
US 2016/0290516 A1 Oct. 6, 2016

(51) Int. Cl.
*F16K 11/07* (2006.01)

(52) U.S. Cl.
CPC ... *F16K 11/0712* (2013.01); *Y10T 137/86461* (2015.04)

(58) Field of Classification Search
CPC ......... F16K 11/0712; Y10T 137/86461; Y10T 137/87767
See application file for complete search history.

(56) References Cited

U.S. PATENT DOCUMENTS

| 2,431,437 | A | | 11/1947 | Van der Werff |
| 2,982,299 | A | | 5/1961 | Ksieski et al. |
| 5,361,803 | A | * | 11/1994 | Stoll ................... F16K 11/0712 137/625.66 |
| 5,971,022 | A | * | 10/1999 | Hayashi .............. F16K 11/0712 137/625.64 |
| 6,174,219 | B1 | | 1/2001 | Mathews |
| 7,637,279 | B2 | * | 12/2009 | Amley .............. A61M 5/14216 137/102 |
| 8,291,927 | B2 | | 10/2012 | Johnson et al. |
| 2014/0034135 | A1 | | 2/2014 | Beschomer et al. |
| 2014/0182716 | A1 | | 7/2014 | Yamada et al. |
| 2016/0153566 | A1 | * | 6/2016 | Berner ..................... F16K 1/44 137/625.34 |

FOREIGN PATENT DOCUMENTS

WO WO 2014/080663 5/2014

* cited by examiner

*Primary Examiner* — Craig Schneider
*Assistant Examiner* — Kevin Barss

(57) ABSTRACT

A spool is disclosed for use in a valve. The spool may have an elongated cylindrical body with a first end and a second end. The spool may also have a first land formed at the first end, a second land axially spaced apart from the first land, and a check element located between the first and second lands. The check element may have an outer diameter that is about 0.5-1% greater than an outer diameter of the second land.

19 Claims, 3 Drawing Sheets

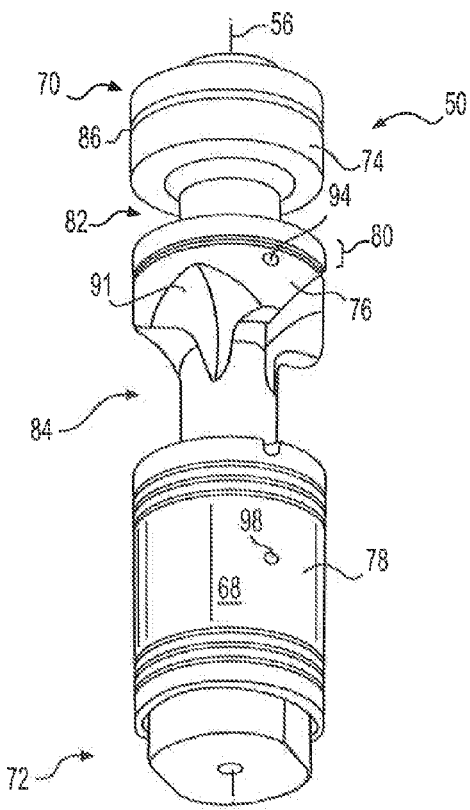
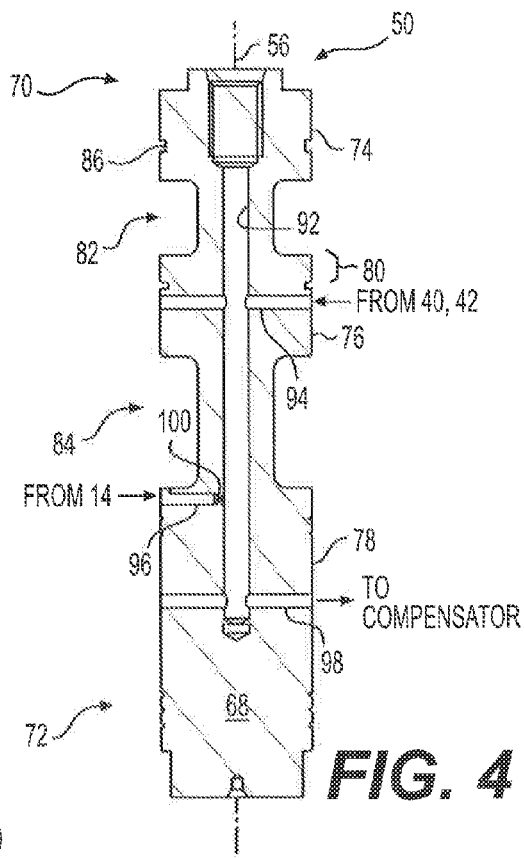
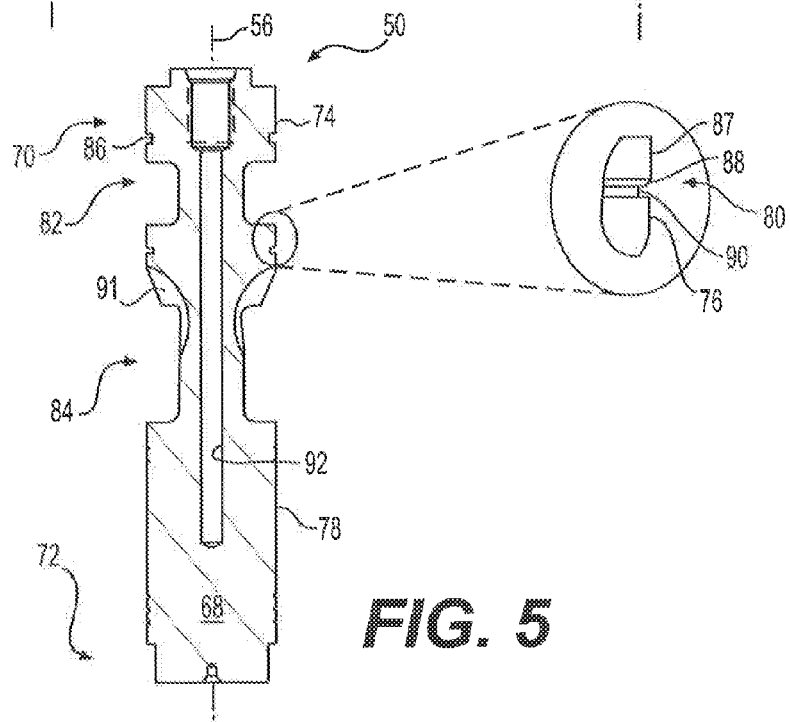

VALVE HAVING IMPROVED SPOOL GEOMETRY

TECHNICAL FIELD

The present disclosure relates generally to a valve and, more particularly, to a valve having improved spool geometry.

BACKGROUND

Hydraulic machines such as dozers, loaders, excavators, backhoes, motor graders, and other types of heavy equipment use one or more hydraulic actuators to accomplish a variety of tasks. These actuators are fluidly connected to a pump of the machine that provides pressurized fluid to chambers within the actuators, and also connected to a sump of the machine that receives low-pressure fluid discharged from the chambers of the actuators. As the fluid moves through the chambers, the pressure of the fluid acts on hydraulic surfaces of the chambers to affect movement of the actuators. A flow rate of fluid through the actuators corresponds to a velocity of the actuators, while a pressure differential across the actuators corresponds to a force of the actuators.

Control over the speed and/or force of hydraulic actuators can be provided by way of one or more metering valves. For example, a first metering valve controls fluid flow into a head-end of a hydraulic cylinder, while a second metering valve controls fluid flow out of the head-end. Likewise, a third metering valve controls fluid flow into a rod-end of the hydraulic cylinder, while a fourth metering valve controls fluid flow out of the rod-end. The different metering valves are cooperatively opened and closed (e.g., based on operator input) to cause fluid to flow into one end of the hydraulic cylinder and simultaneously out of an opposing end, thereby extending or retracting the hydraulic cylinder.

An exemplary metering valve is disclosed in U.S. Patent Publication No. 2014/0034135 of Beschorner et al. that published on Feb. 6, 2014 ("the '135 publication"). In particular, the '135 publication discloses a valve having a body, and a valve element slidingly disposed within the body. The valve element includes a first land, a second land axially spaced from the first land, and a check stem disposed about a portion of the first land. The check stem is enlarged and extends radially beyond the first land to selectively engage an inner surface of the body. A sleeve is disposed about a portion of the second land and is fixedly engaged to the inner surface of the body. A seal is disposed about the second land, between the second land and the sleeve. The seal and the second land separate a working chamber from a control chamber and move together axially within the sleeve.

Although the valve of the '135 publication may be suitable for many applications, the valve may be less than optimal for other applications. In particular, the sleeve may be used only to fill a space within the body that allows assembly of the enlarged check stem into the body. The sleeve may add cost and weight to the valve.

The disclosed valve and spool are directed to overcoming one or more of the problems set forth above and/or other problems of the prior art.

SUMMARY

One aspect of the present disclosure is directed to a spool for a valve. The spool may include an elongated cylindrical body with a first end and a second end. The spool may also include a first land formed at the first end, a second land axially spaced apart from the first land, and a check element located between the first and second lands. The check element may have an outer diameter that is about 0.5-1% greater than an outer diameter of the second land.

Another aspect of the present disclosure is directed to a valve. The valve may include a valve body having a bore with a first end and a second end, a first passage formed adjacent the first end in communication with the bore, and a second passage formed adjacent the second end in communication with the bore. The valve may also include a spool reciprocatingly disposed within the bore of the valve body. The spool may have an elongated cylindrical spool body having a first end disposed within the first end of the bore, and a second end disposed within the second end of the bore. The spool may also have a first land formed at the first end of the elongated cylindrical spool body, an annular seal disposed between an outer surface of the first land and an inner surface of the bore, and a second land axially spaced apart from the first land. The spool may further have a check element located between the first and second lands and configured to selectively inhibit fluid communication between the first and second passages. The check element may have an outer diameter that is about 0.5-1% greater than an outer diameter of the second land and about equal to an outer diameter of the first land. The spool may additionally have a third land formed at the second end of the elongated cylindrical spool body.

Another aspect of the present disclosure is directed to a hydraulic circuit. The hydraulic circuit may include an actuator, a pump, a sump, and a valve disposed between the actuator, the pump, and the sump. The valve may include a valve body having a bore with a first end and a second end, a first passage formed adjacent the first end in communication with the bore and in communication with the actuator, a second passage formed adjacent the second end in communication with the bore and in communication with one of the pump and the sump, and a tapered seat located between the first and second passages. The valve may also include a spool reciprocatingly disposed within the bore of the valve body. The spool may have an elongated cylindrical spool body with a first end disposed within the first end of the bore, a second end disposed within the second end of the bore, a first land formed at the first end of the elongated cylindrical spool body, and an annular seal disposed between an outer surface of the first land and an inner surface of the bore. The spool may also have a second land axially spaced apart from the first land, a frustoconical check element located between the first and second lands and configured to selectively engage the tapered seat and inhibit fluid communication between the first and second passages, and a third land formed at the second end of the elongated cylindrical body. The check element may have an outer diameter that is about 0.7-0.8% greater than an outer diameter of the second land and about equal to an outer diameter of the first land. The valve may also include an electro-hydraulic actuator mounted to the valve body at the first end and connected to the spool. The electro-hydraulic actuator may be operable to selectively move the frustoconical check element away from the tapered seat.

BRIEF DESCRIPTION OF THE DRAWINGS

FIG. 3 is an isometric illustration of an exemplary disclosed spool that may be used in conjunction with the valve of FIG. 2; and FIGS. 4 and 5 are cross-sectional illustrations of the spool of FIG. 3.

DETAILED DESCRIPTION

Figure 1:
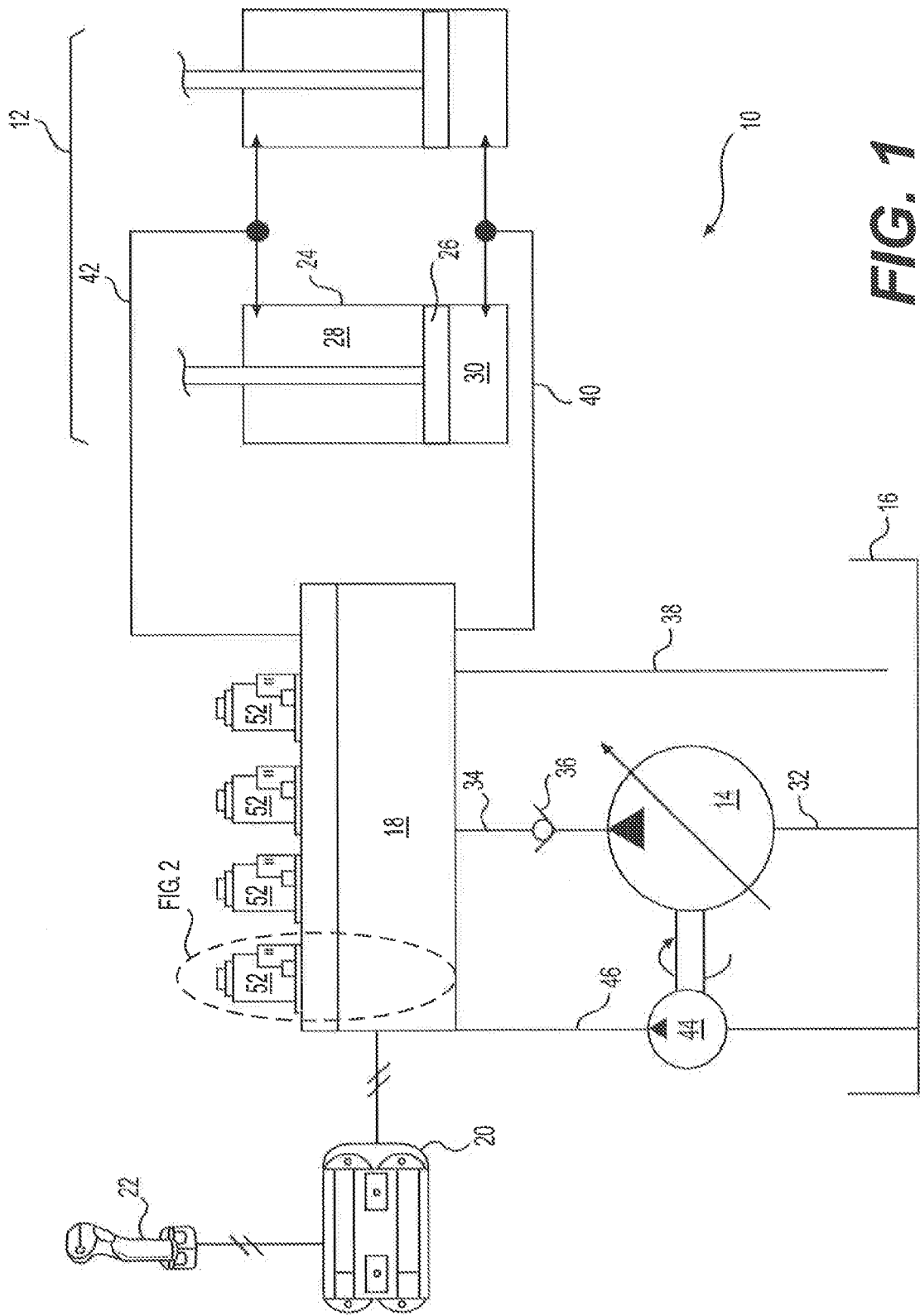
FIG. 1 is a diagrammatic illustration of an exemplary hydraulic circuit.

FIG. 1 illustrates an exemplary hydraulic circuit 10 having at least one tool actuator 12 that is movable based on input received from an operator. In the disclosed embodiment, two actuators 12 are shown that are arranged to operate in tandem. These tool actuators 12 are linear actuators (e.g., cylinders) that are commonly used to raise and lower the boom of a construction machine (e.g., an excavator—not shown). It is contemplated, however, that any number of tool actuators 12 could be included in hydraulic circuit 10, and embody linear or rotary actuators, as desired. Hydraulic circuit 10 may further include a pump 14 configured to draw low-pressure fluid from a sump 16, to pressure the fluid, and to direct the pressurized fluid through a valve 18 to tool actuators 12. Valve 18, as will be described in more detail below, may be selectively energized by a controller 20 in response to operator input received via an interface device 22 to regulate a flow direction, flow rate, and/or a pressure of fluid communicated with tool actuators 12.

Tool actuators 12, as hydraulic cylinders, may each include a tube 24 and a piston assembly 26 arranged within tube 24 to form a first chamber 28 and an opposing second chamber 30. In one example, a rod portion of piston assembly 26 may extend through an end of first chamber 28. As such, first chamber 28 may be considered the rod-end chamber of tool actuator 12, while second chamber 30 may be considered the head-end chamber. Chambers 28, 30 may each be selectively supplied with pressurized fluid and drained of the pressurized fluid to cause piston assembly 26 to displace within tube 24, thereby changing an effective length of tool actuator 12.

It should be noted that, in embodiments where tool actuator 12 is a rotary actuator, the configuration and operation of tool actuator 12 would be similar to that described above for a linear actuator. For example, as a hydraulic motor, tool actuator 12 would include two chambers separated by an impeller. One of these chambers would be selectively supplied with pressurized fluid while the remaining chamber would be drained of fluid to thereby generate a pressure differential that caused the impeller to rotate. The particular chamber filled with fluid or drained of fluid may dictate the rotational direction.

Pump 14 may be fluidly connected to sump 16 by way of suction passage 32, and to valve 18 via a pressure passage 34. In some embodiments, a check valve 36 may be disposed in pressure passage 34 to help ensure a unidirectional flow of fluid from pump 14 to valve 18. Pump 14 may be any type of pump known in the art, for example a fixed or variable displacement piston pump, gear pump, or centrifugal pump. Pump 14 may be driven by an engine, by an electric motor, or by any other suitable power source.

Sump 16 may be connected to valve 18 via a drain passage 38. Sump 16 may constitute a reservoir configured to hold the low-pressure supply of fluid. The fluid may include, for example, a dedicated hydraulic oil, an engine lubrication oil, a transmission lubrication oil, or any other fluid known in the art. One or more hydraulic circuits may draw fluid from and return fluid to sump 16. It is contemplated that hydraulic circuit 10 could be connected to multiple separate sumps 16 or to a single sump 16, as desired. A relief valve (not shown) could be associated with drain passage 38, if desired, to help maintain a desired pressure within hydraulic circuit 10.

Valve 18 may fluidly communicate with tool actuators 12 via head- and rod-end passages 40, 42, and selectively pressurizing of passages 40, 42 may cause desired actuator movements. For example, to retract tool actuators 12, rod-end passage 42 may be filled with fluid pressurized by pump 14 (i.e., passage 42 may be connected with passage 34), while head-end passage 40 may be drained of fluid (i.e., passage 40 may be connected with passage 38). In contrast, to extend tool actuators 12, head-end passage 40 may be filed with fluid pressurized by pump 14, while rod-end passage 42 may be drained of fluid. Valve 18 may facilitate these connections.

In the disclosed example, valve 18 is electro-hydraulically operated. Specifically, valve 18 may have elements that are movable between different positions, when valve 18 is energized, to generate a pilot signal (i.e., a flow of pilot fluid) directed from a pilot pump 44 via a pilot passage 46, that results in the connections described above. In other embodiments, however, valve 18 could be a purely hydraulically-operated valve or a purely electrically operated valve, if desired. In these latter embodiments, pilot pump 44 and pilot passage 46 would be omitted.

Figure 2:
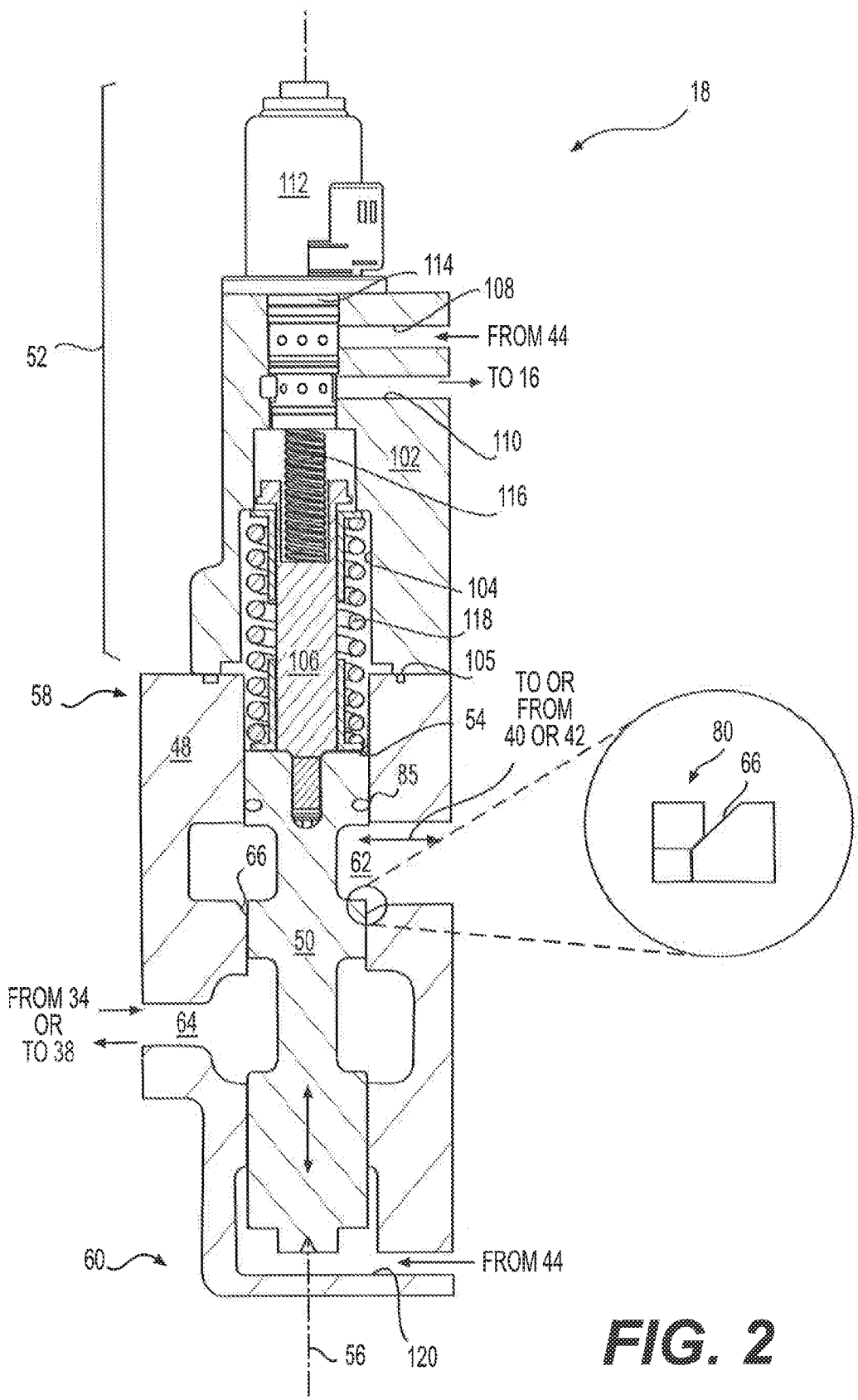
FIG. 2 is a cross-sectional illustration of an exemplary disclosed valve that may be used in conjunction with the hydraulic circuit of FIG. 1.

As shown in FIG. 2, valve 18 may consist of at least three primary components, including a valve body 48, a spool 50 disposed in valve body 48, and a valve actuator 52 mounted to valve body 48 and configured to move spool 50. It should be noted that FIG. 2 illustrates only one exemplary embodiment of valve 18 that could be used to control fluid flow into either of head-end or rod-end passages 40, 42, or fluid flow out of either of head-end or rod-end passages 40, 42. In particular, the embodiment of valve 18 shown in FIG. 2 could be associated with only the head-end of tool actuator 12 or only the rod-end, and could function to only supply fluid to tool actuator 12 or to only drain fluid away from tool actuator 12. Accordingly, hydraulic circuit 10 (referring to FIG. 1) could have four of the same valves 18 that are shown in FIG. 2 to provide for the full functionality of tool actuators 12 or, alternatively, hydraulic circuit 10 could have the one valve 18 shown in FIG. 2 and up to three other valves that are not shown. In the disclosed embodiment, valve 18 includes a single common valve body 48 (see FIG. 1), as well as four separate spools 50 and four separate valve actuators 52 that are connected to the same valve body 48. In other embodiments, however, each spool 50 and valve actuator 52 could be associated with a separate valve body 48. If multiple valve bodies 48 are included, they may be bolted together to form a valve block or connected to each other via conduits.

Valve body 48 may have a bore 54 formed therein for each spool 50 that is housed in valve body 48. Bore 54 may have a central axis 56, and extend from a first end 58 to a second end 60 along axis 56. A first passage 62 may be formed adjacent first end 58 that intersects with (i.e., is in fluid communication with) bore 54, and a second passage 64 may be formed adjacent second end 60 that also intersects with bore 54. In general, first and second passages 62, 64 may be oriented within valve body 48 generally orthogonal to central axis 56. In the disclosed embodiment, bore 54 may be enlarged at first and second passages 62, 64 such that, when spool 50 is disposed inside of bore 54, each of passage 62, 64 may communicate with an entire periphery of spool 50 at the enlarged locations. A seat 66 may be formed at an axial location between first and second passages 62, 64. In the disclosed embodiment, seat 66 is tapered to resemble a funnel that is larger at first passage 62 and smaller at second passage 64. Seat 66 may provide a smooth inner surface against which a portion of spool 50 may seal.

Spool 50 may be movable inside bore 54 along axis 56 to selectively connect or block fluid flow between first and second passages 62, 64. As shown in FIGS. 3-5, spool 50 may have an elongated cylindrical body ("spool body") 68 with a first end 70 and a second end 72. When spool 50 is assembled into valve body 48, first end 70 of spool body 68 may be located inside first end 58 of valve body 48 and second end 72 of spool body 68 may be located inside second end 60 of valve body 48.

Spool body 68 may be shaped to have multiple lands separated by valleys or annular grooves. For example, FIGS. 3-5 show spool body 68 as having a first land 74 located adjacent first end 70, a second land 76 spaced axially apart from first land 74, and a third land 78 located adjacent second end 72. Second land 76 may be positioned axially between first and third lands 74, 78. Each of these lands may be located within respective narrower sections of bore 54, such that lands 74 can function as guides for spool 50. A check element 80 may be located between first and second lands 74, 76, and configured to selectively engage seat 66 described above to inhibit or allow fluid flow between first and second passages 62, 64. A first valley 82 may be located between first land 74 and check element 80, and a second valley 84 may be located between second land 76 and third land 78. First and second valleys 82, 84 may be generally positioned at the enlarged internal openings of first and second passages 62, 64, respectively, when spool 50 is assembled into valve body 48.

The outer diameters of lands 74-78 and check element 80 may be designed to facilitate assembly of spool 50 within valve body 48, with a low amount of undesired leakage. Specifically, in the disclosed embodiment, an outer diameter of second land 76 may be smaller than an outer diameter of first land 74 and check element 80, and the outer diameters of second and third lands 76, 78 may be about equal. It should be noted that the use of the word "about" with respect to dimensions of valve 18 in this disclosure may be interpreted as "within manufacturing tolerances." The diameters of second and third lands 76, 78 may be selected to allow passage of second and third lands 76, 78 through seat 66 during assembly and to inhibit leakage between outer surfaces of second and third lands 76, 78 and inner walls of bore 54. The outer diameter of check element 80 may be selected such that check element 80 may engage and seal against seat 66, without generating an excessive amount of stress in check element 80. In order for the larger diameter of check element 80 to be assembled into its appropriate location (i.e., axially between first and second passages 62, 64), bore 54 at first end 58 should be larger than at seat 66. The outer diameter of first land 74 may be designed to inhibit undesired leakage at this larger area of bore 54. In some embodiments, a dynamic seal 85 (e.g., an o-ring—shown only in FIG. 2) may be assembled around first land 74 (e.g., within an annular groove 86—shown in FIGS. 3-5) to further inhibit undesired leakage.

Check element 80 may have an outer radial surface 87 (shown in the enlarged portion of FIG. 5) that is generally perpendicular to axis 56, and a frustoconical bottom surface ("bottom surface") 88 that adjoins radial surface 86. A portion or all of bottom surface 88 may rest against the tapered surface of seat 66 when check element 80 is in a flow-blocking position. In some embodiments, a relief valley 90 may be formed between check element 80 and second land 76 and function to relieve stresses incurred during opening and/or closing of check element 80.

In a specific example of spool 50, the following dimensional relationships have been shown to be effective at providing desired valve operation (e.g., flow rate, pressure drop, control resolution, responsiveness, etc.) with minimal leakage (e.g., less than about 6 mL/min. at about 27° C.) when spool 50 is exposed to fluid pressures of about 5-6 MPa (e.g., about 5.6 MPa). Check element 80 may have an outer diameter at radial surface 87 that is about 0.5-1% (e.g., about 0.7-0.8%) greater than the outer diameter of second land 76. An axial height of radial surface 87 may be about 15-20% of the outer diameter of check element 80. An axial height of bottom surface 88 may be about 10%, of the axial height of radial surface 87. Second valley 84 may have an outer diameter that is about 80-85% larger than an outer diameter of first valley 82, and an axial length that is about 7-8% of an axial length of first valley 82.

As will be explained in more detail below, second land 76 may be located and shaped to meter fluid between first and second passages 62, 64 (e.g., between first and second valleys 82, 84) when check element 80 is away from seat 66. In particular, second land 76 may have one or more metering slots or notches 91 (shown only in FIGS. 3 and 5) formed in an outer annular surface thereof, at an end opposite check element 80. In the disclosed example, four notches 91 are included and spaced equidistantly around the periphery of second land 76. Notches 91 may have a width and/or depth (e.g., a cross-sectional area) that increases proportionally to a distance away from check element 80. With this configuration, as check element 80 is lifted from seat 66, fluid flow between first and second passages 62, 64 may commence, and the further that check element 80 is lifted (i.e., as more of the second land outer surface and notches 91 are exposed), the greater the flow rate.

When more than one tool actuator 12 is separately supplied with pressurized fluid from pump 14 (referring to FIG. 1), pressure control over the separate supplies may need to be implemented to ensure that a high-consuming actuator does not starve a smaller actuator of fluid. For this purpose, spool 50 may include a plurality of internal passages intended to communicate critical operating pressures to a pressure-compensating device (not shown) intended to regulate the flows of fluid directed to different tool actuators 12. For example, as shown in FIG. 4, spool 50 may include a blind axial passage 92 that extends from first end 70 a distance into third land 78. A first radial passage 94 may be located within second land 76; a second radial passage 96 may be located in third land 78; and a third radial passage 98 may be located in third land 78 closer to second end 72. Second radial passage 96 may have a restricted orifice 100 located therein. First radial passage 94 may communicate first passage 62 (i.e., tool actuator 12) with axial passage 92 when check element 80 is away from seat 66; and second radial passage 96 may communicate second passage 64 (i.e., pump 14) with axial passage 92 when check element 80 is against seat 66. While second radial passage 96 may communicate second passage 64 with axial passage 92 when check element 80 is also away from seat 66, restrictive orifice 100 may create a significant pressure drop that helps ensure that the pressure of tool actuator 12 is the controlling pressure inside axial passage 92. Third radial passage 98 may communicate axial passage 92 with the pressure-compensating device. With this configuration, the pressure-compensating device may selectively direct more or less fluid to a particular tool actuator 12 based on relative operating pressures between the actuators 12 and/or the outlet pressure of pump 14.

The open end of axial passage 92 at first end 70 may be enlarged and/or threaded to accept a portion of valve actuator 52. As discussed above, valve actuator 52, in the disclosed example, is an electro-hydraulic type of actuator. In particular, valve actuator 52 may be selectively energized to communicate pilot signals with the ends of spool 50 that cause spool 50 to move between open (i.e., flow passing) and closed (i.e., flow-blocking) positions. When spool 50 is in the open position, check element 80 may be away from seat 66, and notches 91 may be metering a desired amount of fluid into or out of tool actuator 12. In contrast, when spool 50 is in the closed-position, check element 80 may be against seat 66, blocking fluid flow through notches 91. It should be noted that, although a specific embodiment of valve actuator 52 is shown in FIG. 2, other types of valve actuators could alternatively be included in valve 18.

In the exemplary embodiment of FIG. 2, valve actuator 52 includes an actuator housing 102 having a bore 104 formed therein that is in general alignment with bore 54 of valve body 48. Actuator housing 102 may be connected to an end of valve body 48, and a seal 105 may be located therebetween and around bores 54 and 104. A piston 106 may be reciprocatingly disposed within bore 104 and threadingly connected to first end 70 of spool 50. A first pilot supply passage 108 and a pilot drain passage 110 may be located in housing 102, and configured to communicate pilot pump 44 (e.g., via passage 46—referring to FIG. 1) and sump 16, respectively, with an outer end of bore 104. A solenoid 112 may be connected to the housing 102 at the outer end, and include a plunger (not shown) that is electromagnetically movable within an orifice cage 114 to selectively connect one of first pilot supply and pilot drain passages 108, 110 with bore 104. A first spring 116 may extend between the plunger and piston 106, and function to provide force feedback when solenoid 112 is energized and valve 18 is open. A second spring 118 may be located between the first end of spool 50 and a shoulder of bore 104, and function to close valve 18 when solenoid 112 is de-energized. A second pilot supply passage 120 may be located within valve body 48 at second end 60 (i.e., in communication with second end 72 of spool 50), and configured to help balance forces on spool 50 caused by valve actuator 52. Operation of valve 18 that is initiated by selective energizing of valve actuator 52 will be described in more detail in the following section.

Controller 20 (referring to FIG. 1) may embody a single microprocessor or multiple microprocessors that include a means for monitoring operator input and responsively adjusting flow directions and/or pressures within hydraulic circuit 10. For example, controller 20 may include a memory, a secondary storage device, a clock, and a processor, such as a central processing unit or any other means for accomplishing a task consistent with the present disclosure. Numerous commercially available microprocessors can be configured to perform the functions of controller 20. It should be appreciated that controller 20 could readily embody a general machine controller capable of controlling numerous other machine functions. Various other known circuits may be associated with controller 20, including signal-conditioning circuitry, communication circuitry, and other appropriate circuitry. Controller 20 may be further communicatively coupled with an external computer system, instead of or in addition to including a computer system, as desired.

In some embodiments, controller 20 may rely on sensory information when regulating the flow directions and/or pressures within hydraulic circuit 10. For example, instead of or in addition to the signals generated by interface device 22, controller 20 may communicate with one or more sensors (not shown) to detect actual pressures inside hydraulic circuit 10. These sensors could be mounted in valve body 48 and/or housing 102, if desired. Controller 20 may then automatically adjust flow directions and/or pressures based on the signals generated by the sensors.

Interface device 22 may embody, for example, a single or multi-axis joystick located proximal an operator seat (not shown). Interface device 22 may be a proportional device configured to position and/or orient a work tool (not shown) by producing signals that are indicative of a desired work tool speed and/or force in a particular direction. The position signals may be used by controller 20 to cause corresponding movements of tool actuator 12 (e.g., by selectively energizing actuator 52). It is contemplated that different interface devices 22 may additionally or alternatively be included in hydraulic circuit 10 such as, for example, wheels, knobs, push-pull devices, switches, pedals, and other operator input devices known in the art.

INDUSTRIAL APPLICABILITY

The disclosed valve and spool may be applicable to any hydraulic circuit. The disclosed valve and spool may provide high-performance control of a tool actuator, in a low-cost and low-weight configuration. Control of over movement of tool actuator 12 will now be described in detail with reference to FIGS. 1-5.

During operation of hydraulic circuit 10 (referring to FIG. 1), pump 14 may be driven to pressurize fluid. The pressurized fluid may be directed past check valve 36 to valve 18 via pressure passage 34. At this same time, pilot fluid may be pressurized by pilot pump 44 and directed to valve 18 via pilot supply passage 46. An operator of hydraulic circuit 10 may request movement of tool actuator 12 (e.g., extension or retraction) by manipulating (e.g., tilting) interface device 22 in a corresponding direction by a corresponding amount. Electronic signals generated by interface device 22 may be directed to controller 20, which may responsively energize or de-energize particular valve actuator(s) 52 to achieve the desired tool motion.

During the normal or default state of valve 18, valve actuator 52 may be de-energized. As shown in FIG. 2, when valve actuator 52 is de-energized, pilot fluid from pilot supply passage 46 (referring to FIG. 1) may be communicated with both first and second ends 70, 72 of spool 50 via first and second pilot passages 108, 120, respectively. At this time, because the fluid pressures acting on spool 50 may be nearly balanced, the biasing force of springs 116, 118 may function to urge spool 50 downward (relative to the perspective of FIG. 2) such that check element 80 is maintained against seat 66. In one example, spring 118 has a high closing force of about 1000 N, or about 10 N per mm of circumference of check element 80. In this state, first and second passages 62, 64 may be inhibited from communicating with each other during high-pump pressure situations because of the high force of spring 118, even though the pressure area of check element 80 has been reduced. In addition, valve 18 may experience a reduced amount of leakage during times of low pump pressure situations because of the high force of spring 118, which may increase an efficiency of hydraulic circuit 10.

When valve actuator 52 is energized, the plunger inside of orifice cage 114 may be moved to communicate pilot drain passage 110 with first end 70 of spool 50. This communication may result in a pressure imbalance across spool 50 that causes spool 50 to lift upward. As spool 50 lifts upward, check element 80 may be moved away from seat 66, thereby initiating communication between first and second passages 62, 64 via notches 91. In one example, this could result in pressurized fluid flowing into one of head- and rod-end chambers 28 or 30 of tool actuator 12 from pump 14. In another example, this could result in the draining of one of head- and rod-end chambers 28 or 30 of tool actuator 12 into sump 16. As spool 50 moves further upward, a greater flow area of notches 91 may be uncovered, allowing for a greater flow rate of fluid being communicated between first and second passages 62, 64 and a corresponding greater velocity of tool actuator 12.

Several benefits may be associated with the disclosed valve and spool. In particular, because of the size and dimensional relationships of the different features of spool 50, check element 80 may be relatively small in diameter. This small-diameter nature of check element 80 may allow for bore 54 of valve body 48 to also remain small and still allow assembly of spool 50. Accordingly, a sleeve may not be required to receive spool 50 at first end 70 in order to reduce leakage past first end 70 into bore 54. The omission of such a sleeve may reduce a cost and weight of valve 18.

It will be apparent to those skilled in the art that various modifications and variations can be made to the disclosed spool and valve. Other embodiments will be apparent to those skilled in the art from consideration of the specification and practice of the disclosed spool and valve. For example, although seal 85 is shown and described as being located around first land 74 of spool 50, it is contemplated that, in some embodiments, seal 85 may not be required. It is intended that the specification and examples be considered as exemplary only, with a true scope being indicated by the following claims and their equivalents.

LIST OF ELEMENTS

10. Hydraulic Circuit
12. Tool Actuator
14. Pump
16. Sump
18. Valve
20. Controller
22. Interface Device
24. Tube
26. Piston Assembly
28. First Chamber
30. Second Chamber
32 Suction Passage
34. Pressure Passage
36. Check Valve
38. Drain Passage
40. Head-End Passage
42. Rod-End Passage
44. Pilot Pump
46. Pilot Passage
48. Valve Body
50. Spool
52. Valve Actuator
54. Bore
56. Axis
58. First End
60. Second End
62. First Passage
64. Second Passage
66. Seat
68. Spool Body
70. First End
72. Second End
74. First Land
76. Second Land
78. Third Land
80. Check Element
82. First Valley
84. Second Valley
85. Dynamic Seal
86. Annular Groove
87. Radial Surface
88. Bottom Surface
90. Relief Valley
91. Notch
92. Axial Passage
94. First Radial Passage
96. Second Radial Passage
98. Third Radial Passage
100. Restrictive Orifice
102. Actuator Housing
104. Bore
105. Seal
106. Piston
108. First Pilot Supply Passage
110. Pilot Drain Passage
112. Solenoid
114. Orifice Cage
116. First Spring
118. Second Spring
120. Second Pilot Supply Passage

What is claimed is:

1. A spool for a valve, comprising:
an elongated cylindrical body having a first end and a second end;
a first land formed at the first end;
a second land axially spaced apart from the first land;
a check element located between the first and second lands, and having an outer diameter that is about 0.5-1% greater than an outer diameter of the second land
a first valley formed between the first land and the check element; and
a second valley located between the check element and the second land,
wherein the second valley has an outer diameter that is about 80-85% larger than an outer diameter of the first valley; and
wherein the second valley has an axial length that is about 7-8% of an axial length of the first valley.

2. The spool of claim 1, wherein the outer diameter of the check element is about 0.7-0.8% greater than the outer diameter of the second land.

3. The spool of claim 1, wherein the outer diameter of the check element is about equal to an outer diameter of the first land.

4. The spool of claim 1, wherein the check element includes a frustoconical surface configured to selectively engage a corresponding seat of the valve.

5. The spool of claim 4, wherein the check element includes an outer radial surface that is generally perpendicular to an axis of the elongated cylindrical body.

6. The spool of claim 5, wherein an axial height of the outer radial surface is about equal to 15-20% of the outer diameter of the check element.

7. The spool of claim 6, wherein an axial height of the frustoconical surface is about 10% of the axial height of the outer radial surface.

8. The spool of claim 1, further including a seal groove formed within an outer annular surface of the first land.

9. The spool of claim 1, further including a third land formed at the second end of the elongated cylindrical body.

10. The spool of claim 9, further including:
a blind passage extending axially from the first end toward the second end;
a first radial passage located in the second land and connected with the blind passage; and
a second radial passage located in the third land and connected with the blind passage.

11. The spool of claim 10, further including:
a valley formed between the second and third lands;
a third radial passage formed in the third land between the second land and the second radial passage, the third radial passage connecting the valley with the blind passage; and
a restricted orifice located in the third radial passage.

12. The spool of claim 1, further including a plurality of metering notches formed in the second land at a side opposite the check element.

13. A valve, comprising:
a valve body having:
a bore with a first end and a second end;
a first passage formed adjacent the first end in communication with the bore;
a second passage formed adjacent the second end in communication with the bore; and
a tapered seat located between the first and second passages;
a spool reciprocatingly disposed within the bore of the valve body and having:
an elongated cylindrical spool body having a first end disposed within the first end of the bore, and a second end disposed within the second end of the bore;
a first land formed at the first end of the elongated cylindrical spool body;
an annular seal disposed between an outer surface of the first land and an inner surface of the bore;
a second land axially spaced apart from the first land;
a check element located between the first and second lands and configured to selectively inhibit fluid communication between the first and second passages, the check element having an outer diameter that is about 0.5-1% greater than an outer diameter of the second land and about equal to an outer diameter of the first land wherein the check element includes a frustoconical surface configured to selectively engage the tapered seat;
a third land formed at the second end of the elongated cylindrical spool body;
wherein the check element includes an outer radial surface that is generally perpendicular to an axis of the elongated cylindrical spool body;
wherein an axial height of the outer radial surface is about equal to 15-20% of the outer diameter of the check element; and
wherein an axial height of the frustoconical surface is about 10% of the axial height of the outer radial surface.

14. The valve of claim 13, wherein the outer diameter of the of the check element is about 0.7-0.8% greater than the outer diameter of the second land.

15. The valve of claim 14, further including:
an electro-hydraulic actuator mounted to the valve body at the first end and fluidly connected to the spool, the electro-hydraulic actuator operable to move the check element away from the tapered seat; and
at least one spring operatively engaged with the spool and configured to bias the check element against the tapered seat, the at least one spring having a biasing force of about 10 N per mm of circumference of the check element.

16. A spool for a valve, comprising:
an elongated cylindrical body having a first end and a second end;
a first land formed at the first end;
a second land axially spaced apart from the first land;
a third land formed at the second end of the elongated cylindrical body;
a check element located between the first and second lands, and having an outer diameter that is about 0.5-1% greater than an outer diameter of the second land
a blind passage extending axially from the first end toward the second end;
a first radial passage located in the second land and connected with the blind passage;
a second radial passage located in the third land and connected with the blind passage
a valley formed between the second and third lands;
a third radial passage formed in the third land between the second land and the second radial passage, the third radial passage connecting the valley with the blind passage; and
a restricted orifice located in the third radial passage.

17. The spool of claim 16, further including a plurality of metering notches formed in the second land at a side opposite the check element.

18. The spool of claim 16, wherein the outer diameter of the check element is about equal to an outer diameter of the first land.

19. The spool of claim 16, further including a seal groove formed within an outer annular surface of the first land.

* * * * *